United States Patent Office 2,914,471
Patented Nov. 24, 1959

2,914,471

USE OF POLYETHYLENE TO INCREASE PHASE SEPARATION RATE IN SOLVENT EXTRACTION PROCESS

Maurice K. Rausch, Harvey, Ill., assignor to Sinclair Refining Company, New York, N.Y., a corporation of Maine No Drawing. Application September 12, 1957
Serial No. 683,449

2 Claims. (Cl. 208—311)

This invention relates to an improved process for the solvent extraction of liquid hydrocarbons. More particularly, this invention concerns the use of certain additive materials in a solvent extraction system to increase the rate of phase separation between the predominantly hydrocarbon raffinate phase and the predominantly solvent extract phase.

Solvent extraction processes generally comprise contacting a liquid hydrocarbon to be extracted, such as petroleum lubricating oil stocks, with a solvent selective for one or more of the components of the hydrocarbon either in a mixer and settler or countercurrently through a packed or plate type tower. The solvent, being partially immiscible with the hydrocarbon feed under the conditions of settling, will form, with the extracted hydrocarbon component, a layer separate from the non-extracted or raffinate hydrocarbon portion of the feed and can be separated from the extracted material and recycled back through the system for further contact with an additional amount of the hydrocarbon feedstock.

The efficiency of commercial extraction units in use today is normally quite low due to the fact that the effectiveness of such systems is proportional to the intensity of mixing of the hydrocarbon and the solvent, increased effectiveness being obtained as the mixing intensity increases, while the rate of phase separation decreases as the intensity of mixing increases. Thus it can be seen that as the effectiveness of any one system increases by intensifying the mixing rate the capacity or throughput of the system will be correspondingly decreased due to the longer time necessary to obtain separation between the extract and raffinate phases by settling. For example, in a countercurrent system, an increase in the amount of packing where a packed tower is used, or a decrease in the size of the holes in the plates where a plate-type tower is used will increase the effectiveness of the extraction due to the increased turbulence, but a decrease in the capacity or throughput of the system will be noted because of the extended periods of time required for separation of the phases after the thorough mixing of the solvent and feedstock. It is, therefore, obvious that any means which would increase the settling rate between the raffinate phase and the extract phase without producing any undue deleterious results upon the effectiveness of the system would materially increase its capacity or throughput.

In accordance with the present invention it has been found that an increase in this settling rate can be accomplished by providing in the extraction system a small amount of polyethylene and a waxy hydrocarbon. The polyethylene will be added to the system in a small or minor amount sufficient to facilitate or enhance the phase separation between the raffinate and the extract phases. Generally, the polyethylene is at least about 0.03%, preferably at least about 0.05%, by weight of the hydrocarbon feedstock and can be up to about 10% or more by weight. The upper limit on the amount is a matter of economics, however, no particular advantage has been realized from the use of amounts exceeding about 2.0% by weight of the hydrocarbon feedstock. The polyethylene can be added to the system either intermittently or continuously as desired, with make-up being provided to overcome the removal of the polymer from the system in the raffinate phase. Also, the polyethylene can be dissolved in an inert solvent or a portion of the hydrocarbon feedstock to be treated, stored in the concentrated solution and thereafter introduced into the system in the amounts found most advantageous under the particular operating conditions.

The polyethylenes which are contemplated within the scope of the present invention are those which are dispersible, e.g. miscible, soluble or at least partially dispersible, as a liquid in the hydrocarbon to be extracted and usually these polymers have molecular weights in the range of about 500 to 30,000. Polyethylenes having molecular weights in the range of about 1000 to 18,000 are most desirable since the polymer molecules are of sufficient size to render them more miscible in the hydrocarbon feedstock. Polyethylenes of the desired molecular weight range are commercially available and can be prepared, for example, by compressing ethylene under superatmospheric pressures in excess of over 500 atmospheres and allowing it to react or polymerize under controlled temperature conditions, generally in the range of about 100° to 400° C. with small quantities of oxygen being added to the reaction to catalyze the polymerization. The polymers utilized in the present invention are in general not soluble in the extraction solvents and will usually be carried through the extraction system in the raffinate phase from which they can be removed during subsequent processing of the raffinate, such as in a solvent dewaxing procedure.

The second material which I have found to be essential to the present invention is the presence of a waxy hydrocarbon in the extraction system. By a waxy hydrocarbon, I intend to mean a hydrocarbon fraction having a melting point above about 100° F. and up to about 190° F., preferably about 120 to 175° F. This waxy hydrocarbon can be either microcrystalline or crystalline in nature and is generally of petroleum origin. The amount of the waxy hydrocarbon which is necessary to obtain the benefits of the present invention will generally be in the range of about 0.5% to 50% by weight and preferably about 2.0% to 25% by weight of the charge stock. The waxy hydrocarbon can be naturally present in the hydrocarbon feedstock or the desired waxy component can be added to the feedstock or extraction system if it is not present in the desired quantities. Thus, the hydrocarbon charge stocks which will be treated in the process of the present invention can be waxy oil stocks such as raw waxy neutral lubricant distillates or residuums of lubricating viscosity or non-waxy petroleum distillates or residuums to which have been added the waxy hydrocarbon. These distillates and residuums can be obtained from any crude oil and contain both aromatics and non-aromatics. Preferably, the distillate will have a viscosity of about 50 to 1000 SUS at 100° F.

Generally, the improved phase separators of the present invention are effective in those solvent extraction systems wherein a solvent having a preferential selectivity for the more aromatic type compounds in the feedstock is utilized, e.g. furfural, nitrobenzene, phenol, liquid sulfur dioxide, etc. Thus the feedstocks are liquid hydrocarbons containing aromatic and non-aromatic components such as mineral oils of lubricating viscosity. The conditions under which the extraction tower or shaker-settler processes are operated can be any of those conventional in the art as, for example, temperatures generally in the range of from about 100 to 300° F. with a temperature gradient through the tower of about 0 to 50° F. and solvent to oil ratios of from 0.5 to 6:1 and preferably about 1 to 3:1.

In order to illustrate more fully the increased settling rates obtained by proceeding in accordance with the present invention, shaker-settler studies were conducted with respect to the phenol extraction of a Mid-Continent deasphalted oil obtained by propane extraction of a Mid-Continent heavy residuum yielding 56% of extract based on the charged residuum. This deasphalted oil contained about 20% by weight microcrystalline wax. The microcrystalline wax had the following properties:

| | |
|---|---|
| Gravity ° API | 33.0 |
| Flash, ° F | 550.0 |
| Viscosity SUS at 210° F | 88.0 |
| Melting point, ° F | 160.0 |

The deasphalted oil had the following general characteristics:

| | |
|---|---|
| Gravity ° API | 23.3 |
| Flash, ° F | 530 |
| Viscosity SUS at 210° F | 156.0 |
| Pour, ° F | 100 |
| Aniline point, ° C | 111.7 |

The polyethylene added as a settling rate improver had a molecular weight of about 2000 and a density of 0.92. The procedure for these tests was as follows: 200 volume percent of phenol containing 3 volume percent water was added to the above-described deasphalted oil in a one-liter graduate. The polyethylene was added to three different samples of this mixture in amounts of .01%, 0.10% and 0.5% by weight. Before agitation, the samples were placed in a bath maintained at a constant temperature of about 160° F. for a period of time sufficient to allow temperature equilibrium to be established. The samples were then agitated for 10 minutes with a stirrer operating at a speed of 500 r.p.m.'s. At the end of the 10-minute period the stirrer was stopped, removed, and readings were taken at 30-second intervals of the volume of extract phase settled until complete settling occurred.

From the data thus gathered, the decrease in settling time at 50% and 100% of the extract phase settled and the amount of time saved by using the various polyethylene concentrations was calculated. Table I below shows these results.

Table I

| Amount of Polyethylene | 0.00% | 0.01% | 0.10% | 0.50% |
|---|---|---|---|---|
| Time to 50% settled, minutes | 2.70 | 2.70 | 1.25 | .80 |
| Decrease in time to 50% settled, percent [1] | 0.0 | 0.0 | 53.7 | 70.4 |
| Time to 100% settled, minutes | 6.75 | 6.75 | 2.85 | 2.20 |
| Decrease in time to 100% settled, percent [1] | 0.0 | 0.0 | 57.8 | 68.9 |

[1] As compared to extraction with no additive.

Thus, it can be seen that by using as little as about 0.5% by weight of the above-identified polyethylene in a solvent extraction system wherein the hydrocarbon feedstock to be extracted contains a waxy component, the time for phase separation can be decreased as much as about 70%. It is obvious that such a decrease in settling time will more than double the hydrocarbon throughput in such a system thereby effecting substantial savings in both time and ultimately money when employed on a commercial basis.

After the solvent extraction step, the raffinate can be treated by any of the conventional petroleum procedures which are necessary in order to produce the desired finished lubricating oil, for example, dewaxing, acid treatment, filtration, distillation, etc.

It is claimed:

1. In a process for the solvent extraction of a liquid hydrocarbon containing aromatic and non-aromatic components, the steps which comprise contacting said liquid hydrocarbon in a solvent treating zone with a solvent selective for aromatic components of the said hydrocarbon under conditions which will secure phase separation while providing in said zone about 0.5% to 50.0% by weight of a waxy hydrocarbon having a melting point from about 100° to 190° F. and a small amount sufficient to enhance the phase separation of polyethylene dispersible as a liquid in the hydrocarbon feedstock, and thereafter separating the extract phase from the raffinate phase.

2. In a process for the solvent extraction of a petroleum lubricating oil residuum containing aromatic and non-aromatic components and about 2 to 25% by weight of a waxy component having a melting point of about 120° to 175° F., the steps which comprise contacting the said residuum in a solvent treating zone with a solvent selective for aromatic constituents of the said residuum under conditions which will secure phase separation while providing in said zone about 0.05 to 2% by weight of a polyethylene having a molecular weight of about 1,000 to 18,000 and thereafter separating the extract phase from the raffinate phase.

References Cited in the file of this patent

UNITED STATES PATENTS

| | | |
|---|---|---|
| 2,414,252 | Ashburn | Jan. 14, 1947 |
| 2,718,492 | Leary et al. | Sept. 20, 1955 |
| 2,794,841 | Hay et al. | June 4, 1957 |

OTHER REFERENCES

Resen: "The Oil and Gas Journal," June 16, 1952, page 313.